June 16, 1942.  A. G. SHERMAN  2,286,766
DEEP WELL COOKER
Filed Jan. 8, 1941  2 Sheets-Sheet 2
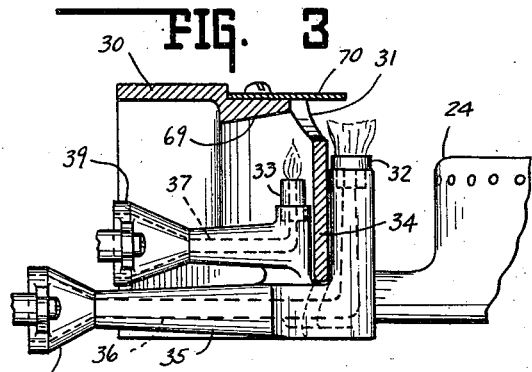
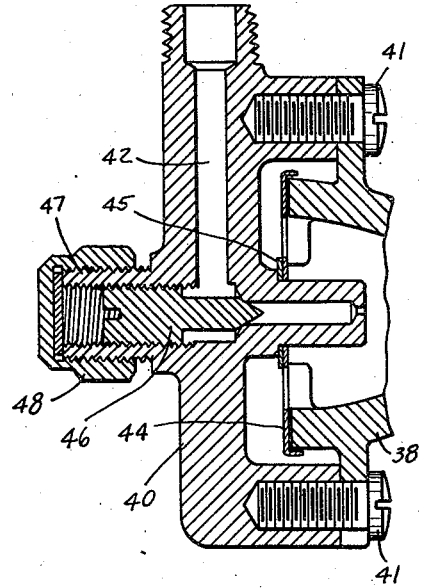
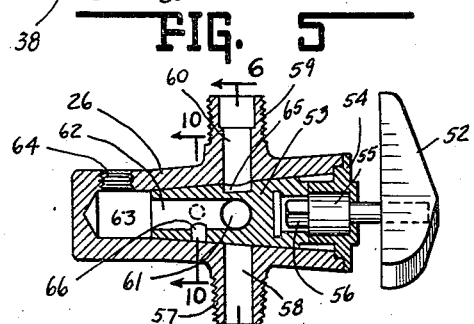
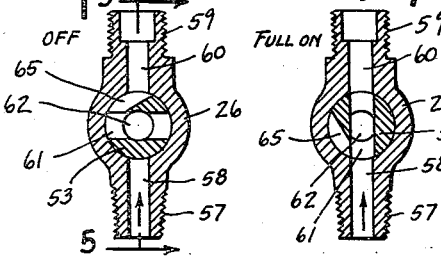
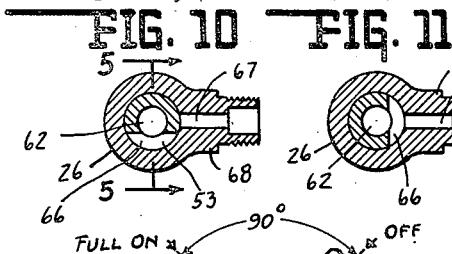
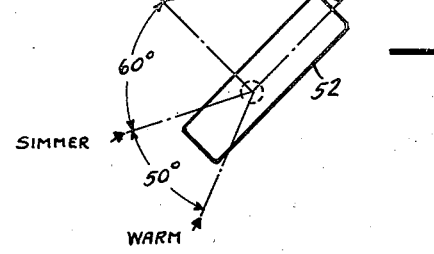
INVENTOR.
ALVIN G. SHERMAN.
BY Lockwood, Goldsmith & Galt,
ATTORNEYS.

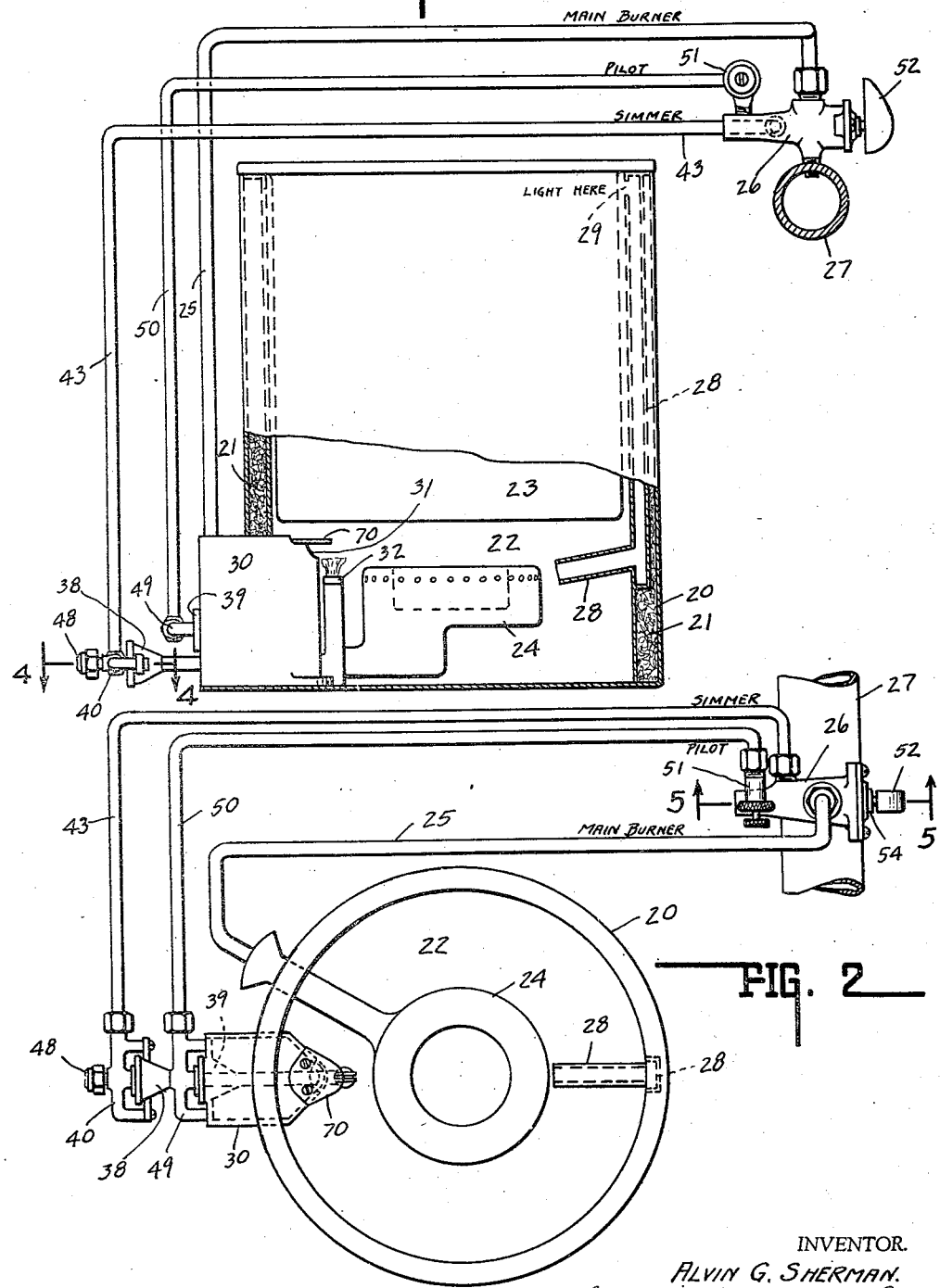

Patented June 16, 1942

2,286,766

UNITED STATES PATENT OFFICE 2,286,766

DEEP WELL COOKER

Alvin G. Sherman, Grosse Pointe, Mich., assignor to Globe American Corporation, Kokomo, Ind., a corporation Application January 8, 1941, Serial No. 373,649

4 Claims. (Cl. 126—39)

This invention relates to a deep well cooker for gas ranges and the like.

In many modern gas ranges a well insulated deep well cooker is used and provides an economical and convenient method of cooking many foods. The burner for such cookers is, however, ordinarily completely hidden from view so that the regulation of the flame cannot be accomplished by eye in the usual manner. The use of pilot lights with burners of this type has heretofore been extremely difficult. This is due to the fact that cooking utensils used in a deep well generally fit the well quite closely. When they are lowered into position or lifted out of the well there is a rush of air due to the piston-like action of the utensil which is apt to extinguish any pilot flame which might be provided.

One object of the present invention is to provide means whereby the heat supplied to the cooker may be regulated in progressive steps suitable for boiling, simmering or warming without the necessity of having the burner flames in a visible position.

Another object of the invention is to provide means whereby a small flame, which may be used either as a pilot light or a warming flame, may be used in the deep well cooker without danger of extinguishing the flame when cooking vessels are placed in position or removed from the well.

Another object of the invention is to provide a series of burners of graduated size, each of which may be lighted from the burner of next higher and next lower size.

Other objects and features of the invention will be understood from the accompanying drawings and the following description and claims:

Fig. 1 is an elevational view partly in section of a deep well cooker having a series of burners of three different sizes, said cooker and burners being arranged in accordance with a preferred form of the invention. Fig. 2 is a plan view of the same. Fig. 3 is an elevational view partly in section of a portion of the apparatus shown in Fig. 1 drawn to a larger scale. Fig. 4 is a sectional view taken substantially on the line 4—4 of Fig. 1 and illustrates a preferred form of regulating means for controlling the intensity of the flame of one of the burners. Fig. 5 is a sectional view in elevation taken on the line 5—5 of Fig. 2 and illustrates a preferred form of control valve by means of which the supply of gas to all of the burners is controlled. Fig. 6 is a sectional view of the same taken on the line 6—6 of Fig. 5. Figs. 7, 8 and 9 are similar views with the parts in different positions. Fig. 10 is a sectional view taken substantially on the line 10—10 of Fig. 5. Figs. 11, 12 and 13 are similar views with the parts in different positions. Fig. 14 is an elevational view of the control knob of the valve shown in Figs. 5 to 13, inclusive, with the positions of said control knob indicated for the various positions of the valve shown in said figures.

Referring now particularly to Fig. 1, there is shown therein a cylindrical casing 20 formed with inner and outer walls having a quantity of insulating material 21 therebetween. Said casing defines a well 22 within which a cooking utensil 23 may be placed, said utensil being suitably supported therein in any well known manner. In the lower portion of the well 22 there is provided a main gas burner 24 which may be of any suitable type and which is supplied with gas through a supply pipe 25 leading from a main control valve 26 mounted on a gas manifold 27. A conduit 28 leads from a position within the well 22 adjacent the burner 24 upwardly through the wall of the casing 20 to a lighter hole 29 adjacent the upper edge of the well. Gas from the burner 24 may be led upwardly through said conduit and may be lighted by a match applied to the lighter hole 29 to light the burner 24.

In the lower portion of the well 22 there is provided a housing 30 shown in Figs. 1, 2 and 3. Said housing is inset in the wall of the casing 20 and has its outer end freely communicating with the atmosphere outside of the well 22. Adjacent the top of the inner wall of the housing 30 there is provided an opening 31. Except for the open outer end and the opening 31, the housing 30 is closed. Associated with the housing 30 there are provided a simmer burner 32 and a warming burner 33. As most clearly seen in Fig. 3, the simmer burner is outside of the housing 30 while the warming burner 33 is within said housing. A wall 34 of the housing 30 is interposed between said burners and the opening 31 in said wall is considerably above the level of either burner. Preferably both burners are mounted on a single fitting 35 having interior passages 36 and 37 for supplying gas to said burners. The fitting 35 extends inwardly through a closely fitting opening in the wall 34 and thence upwardly to the burner 32.

The outer portion of the fitting 35 terminates in a pair of mixing chambers 38 and 39 for the burners 32 and 33 respectively. A fitting 40 best shown in Fig. 4 is attached to the mixing chamber 38 by screws 41 and supplies gas to said mixing chamber through an interior passage 42 connected to a gas supply pipe 43 in turn connected to the main control valve 26. The mixing chamber 38 is supplied with the usual apertured air inlet cap 44 held against undesired rotation by a resilient washer 45. Said cap may be turned by hand in the usual manner to regulate the quantity of air supplied to the mixing chamber. A needle valve 46 is threadedly engaged in a boss 47 on the fitting 40 and may be adjusted to determine the amount of gas supplied to the burner 32. A cap 48 threadedly engaged with the outside of the boss 47 protects the needle valve 46 against undesired movement.

The mixing chamber 39 of the valve 33 is provided with a fitting 49 which is similar to the fitting 40 except that the needle valve 46 and boss 47 are omitted. The mixing chamber 39 is also provided with an apertured air inlet cap and resilient washer similar to those described for the chamber 38. A gas supply pipe 50 conducts gas to the fitting 49 from a needle valve 51 mounted upon the main control valve 26. Said needle valve is of a well known construction and is used to regulate the gas supply to the burner 33 in the same manner that valve 46 regulates the supply of the burner 32.

The main control valve 26 is preferably constructed as best seen in Figs. 5 to 13, inclusive, and is arranged to control the supply of gas to the several burners as indicated by the position of a knob 52 as shown in Fig. 14. When said knob is in the position indicated "off," no gas is supplied to the burners. When the knob is moved to the position "full on," gas is supplied to all three of the burners 24, 32 and 33. In the position marked "simmer," the main burner 24 is turned off but the simmer and warming burners 32 and 33 are supplied with gas. In the last position marked "warm," only the warming burner 33 receives gas.

The valve 26 in the form illustrated herein is of the plug-cock type in which the valve body is provided with a tapered seat having a correspondingly shaped plug 53 seated therein. A cap 54 is secured to the valve body and serves as a bearing for a valve stem 55 having a rectangular portion 56 on its inner end. Said portion 56 fits in a corresponding opening in the plug 53 and serves to rotate the plug as the valve stem is turned. The valve stem 55 has secured thereto the operating knob 52.

The body of the valve 26 is provided with a boss 57 which is threadedly engaged with a suitable opening in the gas manifold 27 and is provided with a port 58 to which gas is supplied from said manifold. An oppositely positioned boss 59 is provided with a similar port 60 and is connected to the gas supply pipe 25 leading to the main burner 24. The plug 53 is provided with a transverse port 61 adapted to provide communication between the ports 58 and 60 when the valve is in the "full on" position shown in Fig. 7. Said plug is also provided with a longitudinal port 62 communicating with the port 61 and with a chamber 63 within the valve body. Chamber 63 communicates with the needle valve 51 to supply gas to the warming burner 33 through a threaded opening 64 adapted to receive the shank of said needle valve. The plug 53 is also provided with a transverse recess 65 which, in the positions of the valve shown in Figs. 8 and 9, establishes communication between the port 58 and the port 62. A second transverse recess 66 in the plug 53 is adapted to establish communication between the port 62 and a port 67 when the valve is in the position shown in Figs. 11 and 12. The port 67 is formed in a boss 68 to which the gas supply pipe 43 leading to the simmer burner 32 is connected.

By means of the construction just shown, it will be obvious that when the plug 53 is in the "Off" position shown in Figs. 6 and 10 there is no communication between the supply port 58 and any of the ports leading to the burners. In the position of Figs. 7 and 11, corresponding to the "Full on" position of the knob 52 in Fig. 14, communication is established between ports 58 and 60 through port 61 for the main burner, through ports 58, 61, 62, 66 and 67 for the simmer burner 32 and from port 62 through chamber 63 for the warming burner 33. The position of the parts shown in Figs. 8 and 12 corresponds to the "Simmer" position of the knob 52 and in this position the port 60 for the main burner is blanked off. Gas is supplied to port 62 for the other two burners through the transverse recess 65. The position of the parts shown in Figs. 9 and 13 corresponds to the "Warm" position of the knob 52 in Fig. 14. In that position the ports 60 and 67 leading respectively to the main burner 24 and the simmer burner 32 are both blanked but communication is still established from port 58 through the recess 65 and port 62 to the chamber 63 for the warming burner 33.

In the use of the apparatus just described, the knob 52 is first turned from the "Off" to the "Full on" position, a lighted match is applied to the lighter hole 29 and the main burner 24 is lighted. The simmer burner 32 is sufficiently close to the main burner to be lighted directly therefrom. The undersurface of the roof of the housing 30 is provided with an upwardly sloping portion 69 best seen in Fig. 3 and this portion of the roof guides at least a part of the gas from the burner 33 through the opening 31. The warming burner 33 is therefore lighted from the simmer burner 32. Thus with the control knob in the "Full on" position, all three burners may be lighted from the single lighter hole. The intensity of the main burner flame may be regulated as desired by positioning the knob 52 at intermediate points between the "Off" and the "Full on" positions. However, the parts are proportioned so that the "Full on" position corresponds to the maximum flame desired for boiling. Since in the use of a deep well cooker the main burner is used for a short time only, the regulation of the main burner itself is not of great importance.

When the food in the cooker has been brought to a boil, the knob 52 may be turned to the "Simmer" position. In that position the main burner is turned off as previously described, the simmer and warming burners remaining lighted. The intensity of the flame of these two burners may be accurately predetermined by the adjustment of the needle valves 46 and 51 to provide sufficient heat to keep the food at the desired cooking point. Thus the cooker may be used for this purpose with an accurately predetermined flame without the necessity of the flame being visible to the cook. If it is desired only to keep the food warm, the knob 52 is turned to the "Warm" position and the simmer burner 32 is thereby extinguished. The intensity of the flame of the warming burner is accurately predetermined by the needle valve 51 to maintain a proper warm condition within the well.

Referring to Fig. 3, it will be seen that a plate 70 is secured to the roof of the housing 30 and extends partially over the burner 32. This plate serves to trap gas from the burner 32 and lead the same through opening 31 into the housing 30. Thus, when the knob 52 is moved from the "Warm" to the "Simmer" position, the simmer burner 32 is lighted from the warming burner 33. Similarly, when the knob 52 is moved from the "Simmer" to the "Full on" position, the main burner 24 is lighted from the simmer burner 32. Thus, the arrangement is such that once the main burner has been lighted, the main control valve may be run through any desired sequence of operating positions and the burners will be properly lighted in each position unless the sequence includes a return to the "Off" position.

One of the principal functions of the housing 30 is to prevent the warming burner 33 from being extinguished when a cooking utensil is placed within the well or withdrawn therefrom. In either case the piston-like action of the utensil causes a rush of air through the opening 31 and the open outer end of the housing 30. The position of the opening 31, considerably above the level of the burner 33, insures that this rush of air cannot reach the base of the flame of said burner. Thus, a relatively small flame may be maintained without danger of extinguishment.

The invention has been described in one of its preferred forms, the details of which may be varied between wide limits without departing from the scope of the invention as defined in the appended claims.

The invention claimed is:

1. In a deep well cooker, a casing forming a cooking well, a gas burner in the lower portion of said well, a housing in the lower portion of said well, the interior of said housing communicating with the atmosphere outside of said well, and a warming burner in said housing, a side wall of said housing being interposed between said burners and having an opening therein for passage of gas for igniting one burner from the other, and said warming burner having its gas orifice below the level of said opening whereby the flame of said second burner is protected against extinguishment caused by a rush of air through said opening as a cooking vessel is lowered into or lifted from said well.

2. In a deep well cooker, a casing forming a cooking well, a housing in the lower portion of said well adjacent a side thereof, a warming burner in said housing, a main burner adjacent the bottom of said well, and a simmer burner located between said housing and said main burner and sufficiently close to said main burner so that each may be lighted from the flame of the other, said housing having an opening therein for passage of gas for lighting the warming burner from the simmer burner and vice versa, and said housing protecting said warming burner from extinguishment when a cooking vessel is lowered into said well or removed therefrom.

3. In a deep well cooker, a casing forming a cooking well, a housing in the lower portion of said well adjacent a side thereof, a warming burner in said housing, a main burner adjacent the bottom of said well, and a simmer burner located between said housing and said main burner and sufficiently close to said main burner so that each may be lighted from the flame of the other, said housing having an opening therein for passage of gas for lighting the warming burner from the simmer burner and vice versa, and means forming a passage for gas from said main burner to a lighting hole adjacent the upper edge of said well for lighting said main burner.

4. In a deep well cooker, a casing forming a cooking well, a housing in the lower portion of said well adjacent a side thereof, a warming burner in said housing, a main burner adjacent the bottom of said well, and a simmer burner located between said housing and said main burner and sufficiently close to said main burner so that each may be lighted from the flame of the other, said housing having an opening therein for passage of gas for lighting the warming burner from the simmer burner and vice versa, a gas supply pipe leading to each of said burners, and a single valve means controlling gas supply to all of said supply pipes and operable progressively through a series of four positions in the first of which no gas is supplied to any of said burners, in the second of which gas is supplied of all of said burners, in the third of which gas is supplied to the simmer and warming burners only and in the fourth of which gas is supplied to the warming burner only.

ALVIN G. SHERMAN.